(12) United States Patent
Tjensvoll

(10) Patent No.: US 9,090,439 B2
(45) Date of Patent: Jul. 28, 2015

(54) DRIVE DEVICE

(75) Inventor: Gaute Tjensvoll, Oslo (NO)

(73) Assignee: Fobox AS, Oslo (NO)

( * ) Notice: Subject to any disclaimer, the term of this patent is extended or adjusted under 35 U.S.C. 154(b) by 194 days.

(21) Appl. No.: 13/641,583

(22) PCT Filed: Apr. 27, 2011

(86) PCT No.: PCT/EP2011/056609
§ 371 (c)(1),
(2), (4) Date: Oct. 16, 2012

(87) PCT Pub. No.: WO2011/134974
PCT Pub. Date: Nov. 3, 2011

(65) Prior Publication Data
US 2013/0029796 A1    Jan. 31, 2013

(30) Foreign Application Priority Data

Apr. 27, 2010  (NO) .................................. 20100608

(51) Int. Cl.
*F16H 7/00* (2006.01)
*B66D 1/20* (2006.01)
*F03B 17/06* (2006.01)
*F16H 7/02* (2006.01)

(52) U.S. Cl.
CPC ............... *B66D 1/20* (2013.01); *F03B 17/061* (2013.01); *F05B 2260/403* (2013.01); *F05B 2260/4021* (2013.01); *F16H 7/02* (2013.01); *Y02E 10/28* (2013.01); *Y02E 10/38* (2013.01)

(58) Field of Classification Search
CPC ..... Y02E 10/722; Y02E 10/721; Y02E 10/28; Y02E 10/723; Y02E 10/726
USPC .......................................................... 474/148
See application file for complete search history.

(56) References Cited

U.S. PATENT DOCUMENTS

| 169,380 | A | * | 11/1875 | Smith | ............................. 474/88 |
| 204,969 | A | * | 6/1878 | Hall | ................................ 474/87 |
| 847,440 | A | * | 3/1907 | Rivett | ............................. 474/88 |
| 1,355,672 | A | | 10/1920 | Howden | |
| 1,957,614 | A | | 5/1934 | Rice | |

(Continued)

FOREIGN PATENT DOCUMENTS

| CH | 308352 A | 7/1955 |
| EP | 2060783 A1 | 5/2009 |

(Continued)

OTHER PUBLICATIONS

Sheppard, Bruce, "International Search Report" for PCT/EP2011/056609, as mailed Jan. 2, 2012, 6 pages.

*Primary Examiner* — Henry Liu
(74) *Attorney, Agent, or Firm* — Winstead PC

(57) ABSTRACT

A drive device for a winch (8) comprising a large belt pulley (1) or chain pulley, a winch drum which is connected to the large belt pulley (1). The large belt pulley (1) is rotatably connected to at least one prime mover such as a motor (7). The device has at least two rotatable secondary shafts (4, 4'), each being parallel to the rotational axis of said belt pulley (1). The secondary shafts (4, 4') are in rotational connection with the large belt pulley (1) via at least one belt/chain. The motor is in rotational connection with one of the secondary shafts. Drive devices according to the same principles for a floating vessel propeller, a hydro turbine and a wave power plant are also described.

16 Claims, 11 Drawing Sheets

(56) References Cited

U.S. PATENT DOCUMENTS

| | | | |
|---|---|---|---|
| 2,058,500 A | 10/1936 | Plucker | |
| 2,145,511 A | 1/1939 | Grohmann | |
| 2,310,081 A * | 2/1943 | Hill | 474/15 |
| 2,498,611 A | 2/1950 | Stayer | |
| 2,508,756 A * | 5/1950 | Jackoboice | 290/1 R |
| 2,755,766 A * | 7/1956 | Wanzer | 440/57 |
| 2,910,891 A * | 11/1959 | Heckethorn | 474/86 |
| 2,917,935 A * | 12/1959 | Haug | 474/84 |
| 3,217,552 A * | 11/1965 | Daub | 474/87 |
| 3,477,536 A * | 11/1969 | Carini | 180/65.51 |
| 3,623,378 A * | 11/1971 | Kraft | 74/86 |
| 3,738,614 A * | 6/1973 | Peterson | 254/358 |
| 3,814,047 A * | 6/1974 | Carpenter | 440/55 |
| 3,911,287 A * | 10/1975 | Neville | 290/53 |
| 3,922,997 A * | 12/1975 | Jameson | 440/75 |
| 3,951,096 A * | 4/1976 | Dunlap | 440/57 |
| 4,006,925 A * | 2/1977 | Scherer | 290/55 |
| 4,088,306 A * | 5/1978 | Falkner | 254/350 |
| 4,162,059 A * | 7/1979 | Fletchall | 254/358 |
| 4,249,085 A * | 2/1981 | Kertzman | 290/53 |
| 4,272,686 A * | 6/1981 | Suzuki | 290/54 |
| 4,282,443 A * | 8/1981 | Seidl | 290/1 R |
| 4,293,295 A * | 10/1981 | van Deuren | 425/331 |
| 4,565,352 A * | 1/1986 | Hasselmann et al. | 254/344 |
| 4,585,950 A | 4/1986 | Lund | |
| 4,678,923 A | 7/1987 | Trepanier | |
| 4,773,824 A * | 9/1988 | Kiss | 416/168 A |
| 4,787,259 A * | 11/1988 | Carson | 74/89.2 |
| 4,796,862 A * | 1/1989 | Peppel | 254/277 |
| 4,925,413 A * | 5/1990 | Newman et al. | 440/75 |
| 5,051,059 A * | 9/1991 | Rademacher | 415/7 |
| 5,254,876 A * | 10/1993 | Hickey | 290/55 |
| 5,798,572 A * | 8/1998 | Lehoczky | 290/54 |
| 5,816,968 A * | 10/1998 | Watson | 474/84 |
| 6,104,097 A * | 8/2000 | Lehoczky | 290/54 |
| 6,118,194 A * | 9/2000 | Kawamura | 310/75 R |
| 6,193,218 B1 * | 2/2001 | Philyaw | 254/326 |
| 6,239,524 B1 * | 5/2001 | Leibowitz | 310/112 |
| 6,327,957 B1 * | 12/2001 | Carter, Sr. | 91/41 |
| 6,551,053 B1 * | 4/2003 | Schuetz | 415/3.1 |
| 6,707,190 B2 * | 3/2004 | Leibowitz | 310/75 R |
| 6,872,049 B2 * | 3/2005 | Christensen | 415/124.1 |
| RE38,887 E | 11/2005 | Bode et al. | |
| 7,012,341 B2 * | 3/2006 | Matsubara | 290/43 |
| 7,075,192 B2 * | 7/2006 | Bywaters et al. | 290/55 |
| 7,223,137 B1 * | 5/2007 | Sosnowski | 440/3 |
| 7,323,792 B2 | 1/2008 | Sohn | |
| 7,326,106 B1 * | 2/2008 | Rogers et al. | 451/350 |
| 7,550,863 B2 * | 6/2009 | Versteegh | 290/44 |
| 7,563,156 B2 | 7/2009 | Anderson | |
| 7,605,490 B2 * | 10/2009 | Srybnik et al. | 290/54 |
| 7,675,211 B2 * | 3/2010 | Dimascio et al. | 310/90 |
| 7,809,477 B2 | 10/2010 | Nitzpon et al. | |
| 7,843,080 B2 * | 11/2010 | Jansen | 290/55 |
| 7,851,937 B2 * | 12/2010 | Poon | 290/55 |
| 7,944,074 B2 * | 5/2011 | Longtin et al. | 290/55 |
| 7,969,037 B2 * | 6/2011 | Segovia et al. | 290/55 |
| 8,033,794 B2 * | 10/2011 | Lee | 416/244 R |
| 8,142,155 B2 * | 3/2012 | Numajiri et al. | 416/132 B |
| 8,242,618 B2 * | 8/2012 | Numajiri | 290/44 |
| 2006/0055173 A1 | 3/2006 | Gianfranco | |
| 2006/0135305 A1 * | 6/2006 | Erez et al. | 474/202 |
| 2006/0138781 A1 * | 6/2006 | Miyake et al. | 290/55 |
| 2006/0172834 A1 * | 8/2006 | Laubender | 474/106 |
| 2006/0177311 A1 * | 8/2006 | Hsu | 416/132 B |
| 2007/0015617 A1 * | 1/2007 | Bertolotti et al. | 474/85 |
| 2008/0284171 A1 * | 11/2008 | Cory | 290/44 |
| 2009/0134623 A1 * | 5/2009 | Krouse | 290/43 |
| 2009/0224552 A1 | 9/2009 | Sulentic | |
| 2011/0281677 A1 * | 11/2011 | Tjensvoll | 474/148 |
| 2012/0152644 A1 * | 6/2012 | Kydd | 180/366 |
| 2012/0292907 A1 * | 11/2012 | Krouse | 290/52 |

FOREIGN PATENT DOCUMENTS

| | | |
|---|---|---|
| FR | 1038146 A | 9/1953 |
| JP | 60-51342 | 4/1985 |
| JP | 2003343403 A | 12/2003 |
| JP | 2005023893 A | 1/2005 |
| NO | 20090433 A | 7/2010 |
| NO | 20100194 A | 8/2011 |
| WO | WO-2006/117607 A1 | 11/2006 |
| WO | WO-2007/108075 A1 | 9/2007 |
| WO | WO-2008/028335 A1 | 3/2008 |
| WO | WO-2008/104060 A1 | 9/2008 |
| WO | WO-2008/153295 A1 | 12/2008 |
| WO | WO-2009/028927 A1 | 3/2009 |
| WO | WO-2009/062232 A1 | 5/2009 |
| WO | WO-2009/142573 A1 | 11/2009 |
| WO | WO-2010/004314 A2 | 1/2010 |
| WO | WO-2010/004314 A3 | 1/2010 |
| WO | WO-2010/086362 A2 | 8/2010 |

* cited by examiner

DRIVE DEVICE

FIELD OF THE INVENTION

The present invention in general relates to a drive device, which, e.g., can be used for a winch, as a ship propulsion drive, thrusters, as or tidal plants. The drive is adapted to have a simplified and compact construction, ensures that the torque over the drive shaft is balanced, is light weight and also has substantially reduced number of components and requires minimum maintenance. In particular, the present invention provides a drive device according to the preamble of the following claims 1, 2, 3 and 4.

TECHNICAL BACKGROUND OF THE INVENTION

Winches are known to persons skilled in the art to have a wide range of applications wherever there is a requirement for lifting and releasing of load, involving a high torque. For example in oil platforms, floating platforms, sailing boats, elevators, anchoring of boats, drilling operations, cargo loading and unloading, E.O.T cranes, building constructions and so on.

It is also known that diesel electric propulsion drives are used to propel a floating vessel and require high power to be transmitted from the motor to the propeller.

Further, tidal power plants are known to be designed to transform the movement of the water to electric power. This requires high power to be transmitted.

The present invention will be explained primarily with reference to as a drive for a winch but it is equally effective in its application as diesel engine propulsion drives for floating vessels and as drives for generation of electricity, in tidal power plants and the like.

Different types of winches, having multifarious applications are already known as stated hereinbefore. WO2008/104060 discloses a winch which facilitates erecting and collapsing a vertical axis turbine. WO2010/004314 discloses application of winch for connecting a first body to a second body in an off shore environment. WO2009/028927 discloses a traction winch for a cable or the like intended to haul very heavy loads by means of cables for offshore abandonment recovery, oceanography and dredging at great depths. WO2008/153295 discloses application of a winch as a lifting device of a fire escape apparatus.

In all the aforesaid prior art documents, focus has been on the winch rather than on the unit for driving the winch. Driving units for winches are also known. An axial drive means has been disclosed in WO2010/004314 for maintaining correct spooling of the winch line. However, here the focus is on the construction of the winch rather than on its drive unit. Similarly, WO2009/062232 discloses a drum winch which has application in marine vessels as an anchor drum winch. Here, the focus is on the aspect that the winch drum can rotate independently of the drive shaft. Although, this prior art discloses a drive unit coupled to the drive shaft, it does not focus on the constructional features of the drive unit of the winch. Rather, it states that the drive unit may adopt any suitable form and that the exact nature of the drive unit is not consequential to the invention.

The hunt for constructing efficient drive units for winches has witnessed several prior patents/patent publications. U.S. Pat. No. 4,565,352 discloses a winch drive with an internally arranged planet gear and a motor for driving the winch drum. The motor is secured to the frame at one front end of the drum and the drive shaft of the motor is drivingly connected to the driven input of the planet gear. WO2006/117607 discloses a driving means for a winch, for conveying rotational movement from hub to the drive assembly. The winch has a hub, a guiding system for distributing cable about the hub and a drive assembly connected to the guiding system. This assembly distributes the cables in two directions, for which it has a switch. The driving means comprises a first sprocket and a second sprocket connected to the drive assembly and a chain which connects the first sprocket and second sprocket. WO2009/142573 essentially discloses a drive unit having a rotatably mounted rope drum and a shaft driving the same via transmission means and a crank, the latter having a driving shaft using at least two different gearing means.

The drive units disclosed in the above documents do not focus on achieving compactness, on reducing the number of components and on light, weight and on ensuring that the torque over the drive shaft is balanced. This is not only true for winch drives, but also for drives for propelling floating vessels where the requirement for transmitting high power from the motor to the propeller exists. This is also true for drives for generating electricity in tidal power plants, where the drive performs the role of gearing up the electric generator. In such drives also, requirement for transmission of high power exists.

A drive unit for a wind mill is described in an at the present time unpublished patent application PCT/EP2010/050987 by the same applicant and inventor. This prior application relates to the use as a wind mill drive only, but some of the basic ideas of the prior application is used in the present invention for other purposes than a wind mill drive.

Hence, there was a long felt need to construct a drive device for a winch/floating vessel propeller/tidal plant which is compact, ensures that the torque over the drive shaft is balanced, is light weight and also has substantially reduced number of components. The drive device according to the present invention meets this long felt need and other needs associated therewith and the construction of the drive device as disclosed hereinafter, is consequential to the present invention.

OBJECTS OF THE INVENTION

The present invention aims to meet the above need hitherto not taught by prior art, by providing a specially constructed drive device for a winch, which by virtue of its specially configured construction constitutes a light weight and compact drive device and plays a significant role in running the winch smoothly and efficiently.

Another object of the present invention is to provide a drive device for a winch which apart from being compact and light weight ensures that the torque over the drive shaft is balanced and simultaneously does not require heavy maintenance, due to the lesser number of components.

It is another object of the present invention to provide a specially constructed drive device for a floating vessel propeller, which by virtue of its specially configured construction constitutes a light weight and compact drive device and plays a significant role in running the propeller smoothly and efficiently.

Another object of the present invention is to provide a drive device for a floating vessel propeller which apart from being compact and light weight ensures that the torque over the drive shaft is balanced and simultaneously does not require heavy maintenance, due to the lesser number of components.

It is a further object of the present invention to provide a specially constructed drive device for a tidal power plant which by virtue of its specially configured construction constitutes a light weight and compact drive device and plays a significant role in running the electric generator smoothly and efficiently and in gearing it up.

Another object of the present invention is to provide a drive device for a tidal power plant which apart from being compact and light weight ensures that the torque over the drive shaft is balanced and simultaneously does not require heavy maintenance, due to the lesser number of components.

In addition, the present invention discloses some advantageous features still not disclosed in prior art.

All through the specification including the claims, the words "winch", "drum", "shaft", "large belt pulley", "small belt pulley", "belt/chain", "floating vessel", "propeller", "tidal power plant", "tidal current propeller", "water turbine wheel" are to be interpreted in the broadest sense of the respective terms and includes all similar items in the field known by other terms, as may be clear to persons skilled in the art. Restriction/limitation, if any, referred to in the specification, is solely by way of example and understanding the present invention. Further, it should be understood to persons skilled in the art that the drive device according to the present invention is applicable for driving all types of winches such as those stated as examples, under the heading BACKGROUND OF THE INVENTION and the present invention is not limited to such examples.

SUMMARY OF THE INVENTION

According to a first aspect of the present invention there is provided a drive device for a winch comprising a large belt pulley or chain pulley, a winch drum which is connected to the large belt pulley. The large belt pulley is rotatably connected to at least one prime mover, such as a motor. According to the invention at least two rotatable secondary shafts each being parallel to the rotational axis of said belt pulley. The secondary shafts are in rotational connection with the large belt pulley via at least one belt/chain. The at least one motor is in rotational connection with at least one of said secondary shafts.

According to a second aspect of the present invention, there is provided a drive device for a floating vessel propeller comprising a large belt pulley or chain pulley, at least a floating vessel propeller removably mounted on a shaft which is connected to the large belt pulley. The large belt pulley is rotatably connected to at least a prime mover such as an electrical motor or combustion engine. According to the invention at least two rotatable secondary shafts each being parallel to the rotational axis of said belt pulley. The secondary shafts are in rotational connection with the large belt pulley via at least one belt/chain. The at least one engine is in rotational connection with at least one of said secondary shafts.

According to a third aspect of the present invention there is provided a drive device for a hydro turbine comprising a large belt pulley or chain pulley, at least a tidal current propeller or a water turbine wheel. The large belt pulley is rotatably connected to at least an electric generator. According to the invention at least two rotatable secondary shafts each are parallel to the rotational axis of said belt pulley. The secondary shafts are in rotational connection with the large belt pulley via at least one belt/chain. The at least one electric generator is in rotational connection with at least one of said secondary shafts.

According to a fourth aspect of the present invention there is provided a drive device for a wave power plant comprising a large belt pulley or chain pulley, a longitudinal tension member which is connected to said large belt pulley for transferring movement between two relatively movable parts of the wave power plant to the drive device, and said large belt pulley being rotatably connected to at least one generator. According to the invention at least two rotatable secondary shafts each being parallel to the rotational axis of said belt pulley. The secondary shafts are in rotational connection with the large belt pulley via at least one belt/chain. The at least one generator is in rotational connection with at least one of said secondary shafts.

According to an advantageous embodiment of the present invention there is provided a single belt or chain extending over each said secondary shaft and said large belt pulley.

According to another advantageous embodiment of the present invention a small belt pulley or chain pulley is removably fitted to each said secondary shaft and there is provided a belt or chain, one each over respective small belt pulley and the shaft of said motor/engine/electric generator.

Preferably, there is provided along said secondary shafts, at east two further smaller pulleys smaller in size than said respective small belt pulleys.

More preferably, there is provided a single belt or chain extending over said further smaller pulleys and said large belt pulley.

The above embodiments thus reveal construction of a drive unit which is very compact, light weight, simplified due to the lesser number of the components and consequently needs minimal maintenance. This arrangement also ensures that the torque over the drive shaft is perfectly balanced and conversion of high rotational speed to low rotational speed. Consequently, greater speed reduction is achieved thereby gaining high torque. Furthermore, this arrangement also ensures conversion of low rotational speed to high rotational speed.

According to another advantageous embodiment of the present invention, said secondary shafts are arranged around said large belt pulley at the same angular relative distance.

According to a further embodiment of the present invention all said pulleys are provided with serrations along respective circumferential surfaces for ensuring proper gripping during running condition.

Preferably, each belt/chain is provided with teeth/grooves for ensuring proper gripping during running condition.

It is preferred according to the present invention that the drum of said winch, said floating vessel propeller, said tidal current propeller, all said pulleys, the main shaft, the secondary shafts and the shaft of said motor/engine/electric generator are all arranged to be co-axial.

Preferably, the said device is adapted to cause rotation of the winch drum/floating vessel propeller/electric generator in either direction.

More preferably, the drive device is operatively connected to a brake mechanism located along the shaft of said motor/engine/tidal current propeller and is adapted to be actuated when desired, either manually or automatically.

According to an advantageous embodiment of the present invention, a plurality of said small belt pulleys, said further smaller pulleys smaller in diameter than respective said small belt pulleys are removably fitted to respective secondary shafts, each said secondary shaft being in rotational connection to said large belt pulley and to individual motors/engines/electric generators.

According to an advantageous embodiment of the first aspect of the present invention, said prime mover is a diesel engine.

According to an advantageous embodiment of the second aspect of the present invention said floating vessel propeller has at least three blades.

According to an advantageous embodiment of the third aspect of the present invention, the tidal current propeller has at least two blades and shaft of said propeller is a low speed shaft being connected along said main shaft.

Preferably, the shaft of said electric generator is a high speed shaft.

According to a fifth aspect of the present invention, there is provided an integrated driving system for a floating vessel propeller comprising a plurality of drive devices according to the second aspect of the present invention, each said drive device is in rotational connection to each other via respective small belt pulleys adjacent to each other.

SHORT DESCRIPTION OF THE FIGURES

Having described the main features of the invention above, a more detailed and non-limiting description of some exemplary embodiments will be given in the following with reference to the drawings, in which FIG. 1 is perspective view of the winch drive according to a preferred embodiment of the present invention with the motor end facing away.

DETAILED DESCRIPTION OF THE INVENTION

Figure 1:
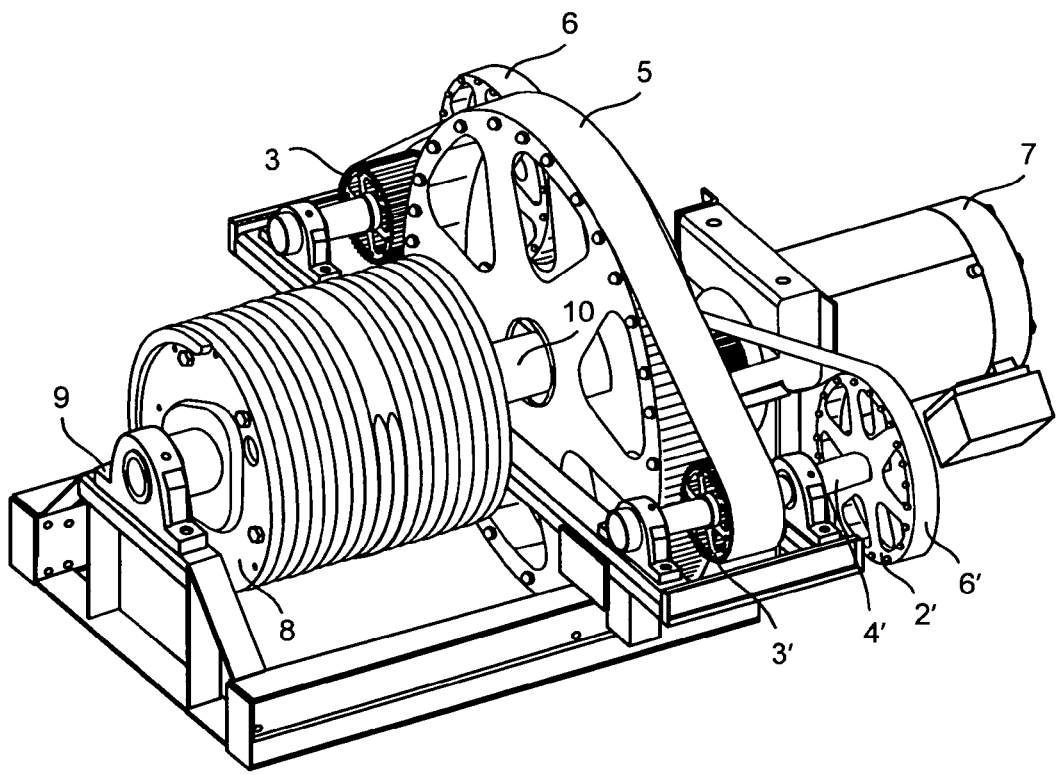
Figure 2:
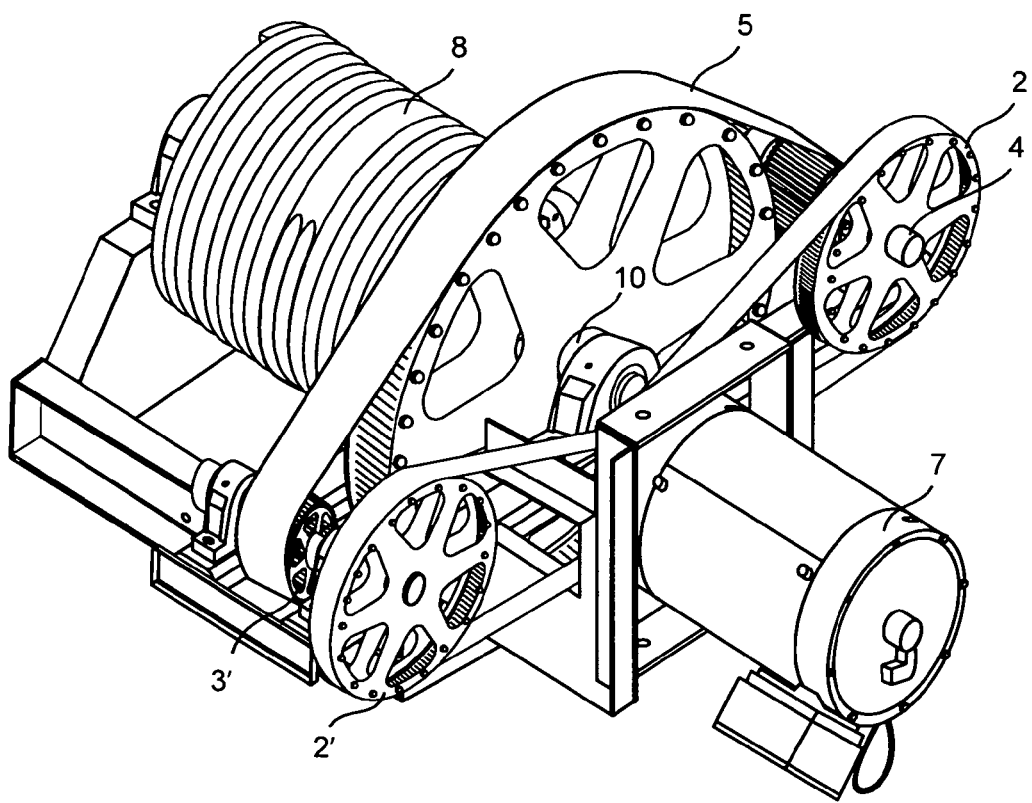
FIG. 2 is another perspective view of the winch drive according to a preferred embodiment of the present invention with the winch drum end facing away.

The accompanying FIG. 1 illustrates a preferred embodiment of the drive device according to the present invention for driving a winch. It shows the drive device when viewed from the winch drum end. The accompanying FIG. 2 shows the same device from the motor end. In this context, it is hereby clarified that the winch drive illustrated in the accompanying FIGS. 1 to 5 is only by way of example and illustration and such drive is equally effective in its application for driving floating vessel propellers (FIGS. 6 to 9) and for running electric generators in tidal power plants (FIG. 10) and essentially runs on the same principle.

The drive device comprises a large belt pulley 1 or chain pulley mounted on a rotatable main shaft 10. The large belt pulley 1 is connected to a winch drum 8 along the shaft 10. The winch drum is preferably supported on a bearing housing 9. The large belt pulley 1 is also rotatably connected to a generator/motor 7, that being the prime mover, which is in rotational connection with two rotatable secondary shafts 4,4' (shown in the accompanying FIGS. 3 and 4). Each of these shafts are arranged to be parallel to the main shaft 10. The secondary shafts 4, 4' are also in rotational connection with the large belt pulley 1. Now all these rotational connections are achieved by a system of operatively connected belts/chains 5, 6, 6'. This facilitates that the construction of the drive unit is very compact, light weight, simplified due to the lesser number of the components and consequently needs minimal maintenance. This also ensures that the torque over the drive shaft is perfectly balanced. Due to the very simplified connectivities between the various components in rotational motion, through a simple arrangement of belts/chains, the requirement for increased number of components is done away with which was hitherto unknown. This arrangement also ensures conversion of high rotational speed to low rotational speed and achieving greater speed reduction. Consequently, gaining high torque is also ensured. How, the drive device works through a simple arrangement of belts/chains is now explained below with reference to the accompanying FIGS. 1 and 2 and also with reference to the accompanying FIGS. 3 and 4.

A single large belt or chain 5 extends over each said secondary shaft 4, 4' and the large belt pulley 1. The secondary shafts are mounted along the drive device, parallel to the large belt pulley 1 and the main shaft 10. Now a small belt pulley or chain pulley 2, 2' is removably mounted on each said secondary shaft 4, 4'. Belts or chains 6, 6' are disposed, one each over respective small belt pulley 2, 2' and the shaft (not shown) of the motor. More preferably, there is provided along the secondary shafts 4, 4' at least two further smaller pulleys 3, 3' smaller in size than the respective small belt pulleys 2, 2'. The single large belt or chain 5 in that event extends over the further smaller pulleys 3, 3' and the large belt pulley 1. Most preferably, the secondary shafts 4, 4' are arranged around the large belt pulley 1 at the same angular relative distance.

Figure 3:
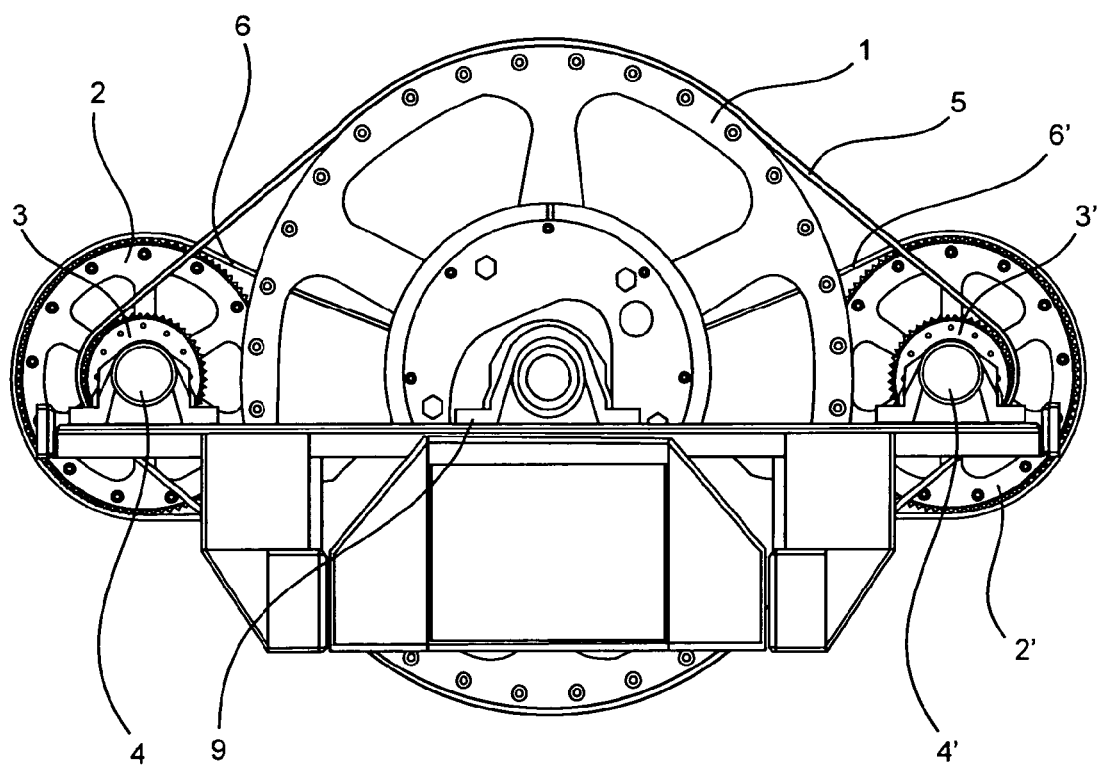
FIG. 3 is a side view of the winch drive according to a preferred embodiment of the present invention when viewed from the winch end.
Figure 4:
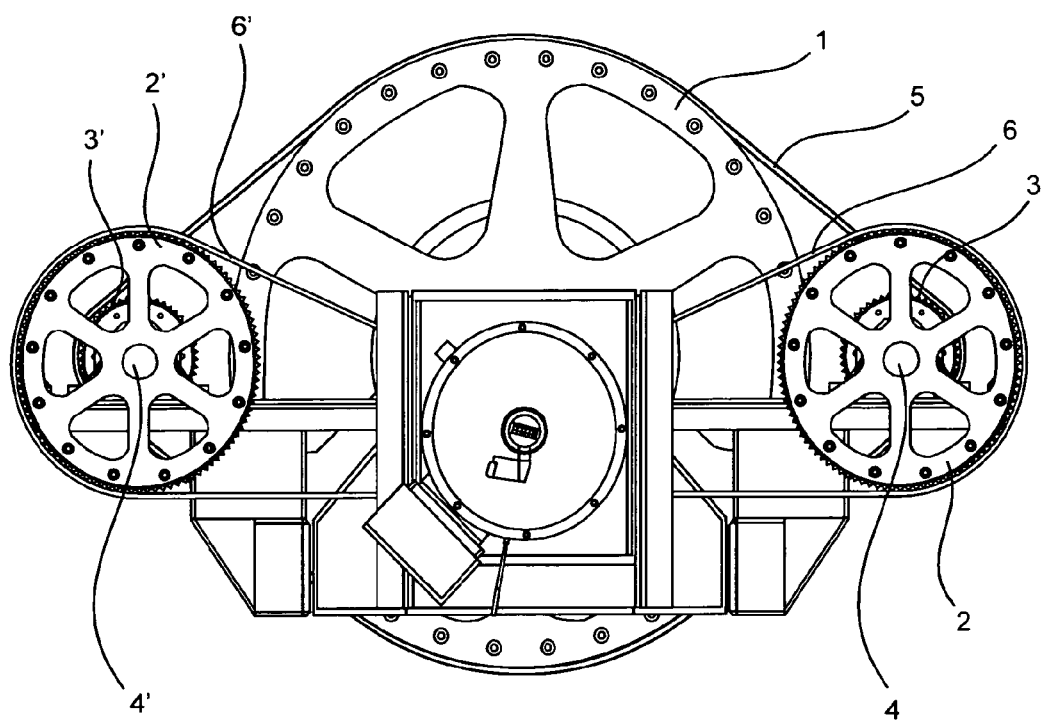
FIG. 4 is a side view of the winch drive according to a preferred embodiment of the present invention when viewed from the motor end.
Figure 5:
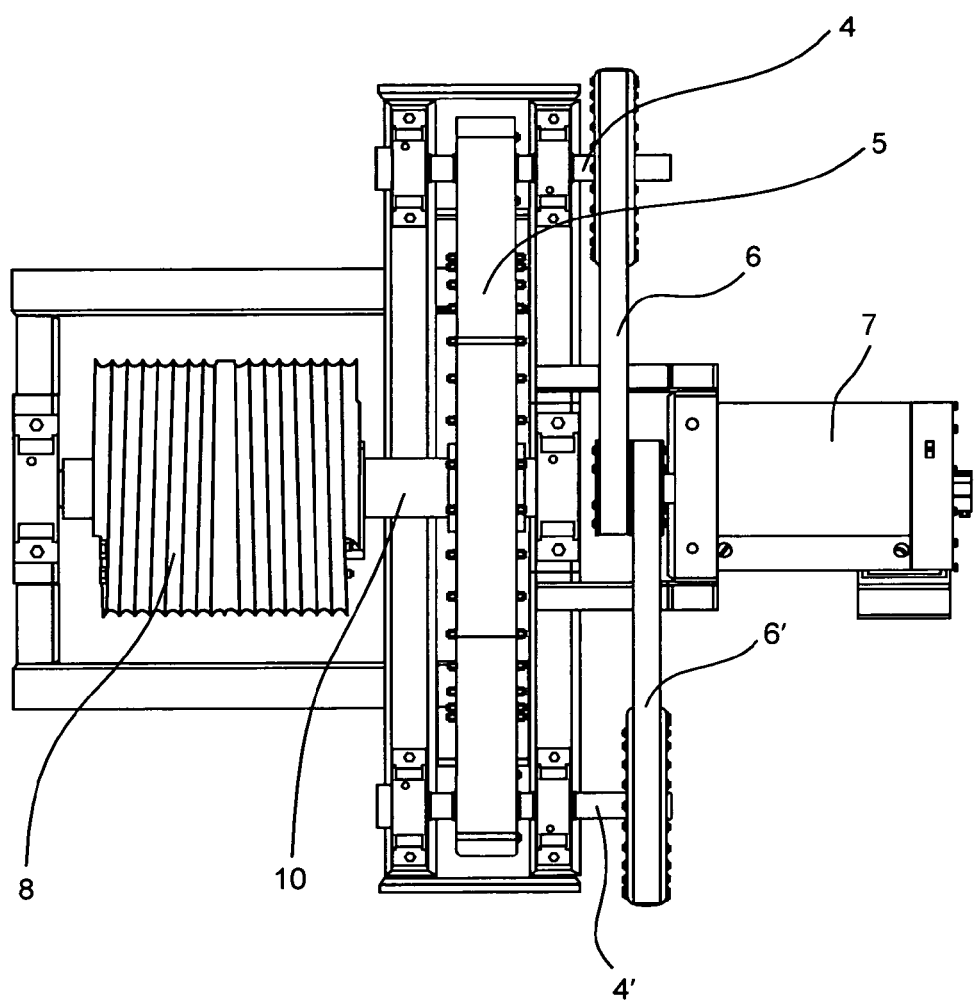
FIG. 5 is a top view of the winch drive according to a preferred embodiment of the present invention.

The above arrangement would be very clear particularly from the accompanying FIGS. 3, 4 and 5. As stated before, the winch drum is preferably supported on a bearing housing 9. It will be apparent to persons skilled in the art from the accompanying FIGS. 1, 2, 3, 4 and 5 that there are similar bearing housings in the drive unit for mounting the other components as well. It will be also clear from the figures that the winch drum, the pulley, the main shaft, the secondary shafts and the motor shaft are all arranged to be co-axial.

Now referring to the figures, once the motor starts operating the motion is transferred to the small belt pulleys 2, 2' via the belts 6, 6'. This motion is thereafter transferred to the secondary shafts 4, 4', then to the further smaller pulleys 3, 3' and consequently, via the belt 5 to the large belt pulley 1. The large belt pulley 1 in that event, drives the winch drum 8 for releasing or lifting the load, it would be clear to persons skilled in the art that in place of a motor 7 run by electricity, the prime mover may be a diesel engine as well; depending upon requirement and it is adapted to rotate in either direction to cause rotation of the winch drum in either direction as required. Further the term motor as used in the description hereinabove and hereinafter including the claims should be interpreted to embrace engines as well and is not restricted to an electric motor.

The various pulleys are provided with serrations (not shown) along respective circumferential surfaces for ensuring proper gripping during running condition. Further, each belt/chain is provided with teeth/grooves (not shown) for ensuring proper gripping during running condition. Preferably, the belts are made up of special fibre reinforced rubber. For emergency purpose, the drive device may be operatively connected to a brake mechanism, for protection against power failure as well as for inching operation. The brake mechanism is preferably either located along the motor shaft or the winch drum shaft. The pulleys may be provided with spokes so that a plurality of openings is formed through the belt pulleys. This facilitates ventilation and easy access for maintenance.

The belt pulleys can be made according to the methods described in Norwegian unpublished patent application 20100194 filed 2, Feb. 2010.

It should be understood to persons skilled in the art that a plurality of the small belt pulleys 2, 2' and the further smaller pulleys 3, 3' may be removably fitted to respective secondary shafts 4,4' each secondary shaft being in rotational connection to the large belt pulley 1 and to individual motors 7.

It will be apparent from the above description, that the drive device for winch according to the present invention has a very simplified construction, is light weight, compact, requires low maintenance and ensures that the torque over the drive shaft is balanced. This is achieved primarily by a system of belts/chains solely by virtue of which, rotation of the various components is achieved. Due to the very simplified connectivities between the various components in rotational motion, through a simple arrangement of belts/chains, the requirement for increased number of components is done away with which was hitherto unknown.

Now the application of the drive device according to the present invention, for running floating vessel propellers, will be explained with reference to the FIGS. 6 and 7. The like reference numerals indicate the same features and the device essentially runs in the same manner as the winch drive, governed by the same principle. Each feature of the winch drive, other than the winch drum 8 as described hereinbefore, is also applicable to the drive device for floating vessel propeller and functions in the same manner. However, as it will be understood by persons skilled in the art that the prime mover 7 here, is preferably a diesel engine of desired horse power, but can also be an electric motor connected to an electro generator, which in turn is coupled to a diesel engine, depending upon the size and weight of the floating vessel.

Figure 6:
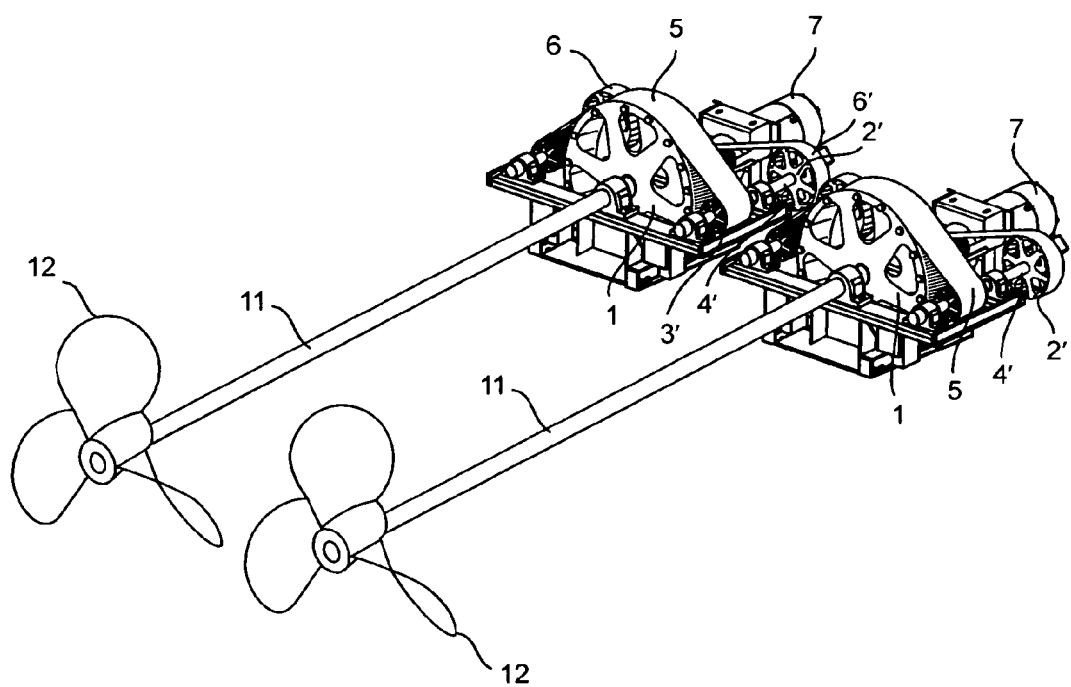
FIG. 6 is a perspective view of two operatively connected floating vessel propeller drives according to another embodiment of the present invention.
Figure 7:
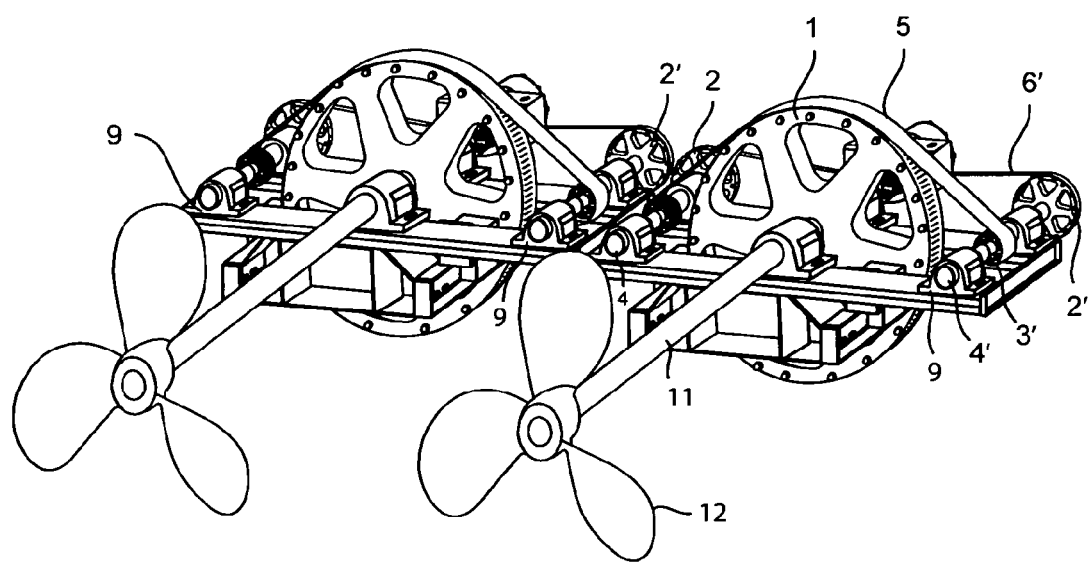
FIG. 7 is another perspective view of two operatively connected floating vessel propeller drives shown in the accompanying FIG. 6, when viewed from a different angle.

The accompanying FIGS. 6 and 7 illustrate two such drives operatively connected in running condition. As it will be clear from such drawings, there can be a plurality of such devices connected along the respective small belt pulleys 2, 2', Each propeller 12 is removably mounted on a horizontal shaft 11. The horizontal shaft 11 is rotatably connected to the main shaft 10. When the engine 7 starts operating, the motion is transferred to the small belt pulleys 2, 2' via the belts 6, 6'. This motion is thereafter transferred to the secondary shafts 4, 4', then to the further smaller pulleys 3, 3' and consequently, via the belt 5 to the large belt pulley 1. The large belt pulley 1 in that event, drives the horizontal shaft 11 and consequently the propeller 12. It would be clear to persons skilled in the art that, the prime mover 7, usually a diesel engine or an electric motor connected to a generator, which in turn is connected to a diesel engine, is adapted to rotate in either direction to cause rotation of the propeller 12 in either direction.

Preferably, the floating vessel propeller 12, all pulleys 1, 2, 2', 3, 3', the main shaft 10, the secondary shafts 4, 4' and the shaft (not shown) of the engine are all arranged to be co-axial. The drive device is operatively connected to a brake mechanism (not shown) located along the shaft of the engine 7 and is adapted to be actuated automatically, in the event of stoppage of the engine 7. The brake mechanism may be applied manually also, when desired. There may be a plurality of small belt pulleys 2, 2' and further smaller pulleys 3, 3' removably fitted to respective secondary shafts 4, 4', each said secondary shaft being in rotational connection to the large belt pulley and to individual engines 7.

Now the application of the drive device according to the present invention, for running an electric generator in a tidal power plant, will be explained with reference to the accompanying FIGS. 8 and 9. The like reference numerals indicate the same features as described with reference to the accompanying FIGS. 1 to 5 hereinbefore and have identical functions and the device is essentially governed by the same principle. However, as it will be understood by persons skilled in the art that the motion initiates from the opposite direction, the initial prime mover being a tidal current propeller 15. Further, it ought to be clear from the accompanying FIG. 9 that the drive performs the role of gearing up the electric generator. The wheel element 16, housed within the nacelle 14 and to which the propeller 15 is attached, is connected to the main shaft 10 via the low speed shaft 13.

Figure 8:
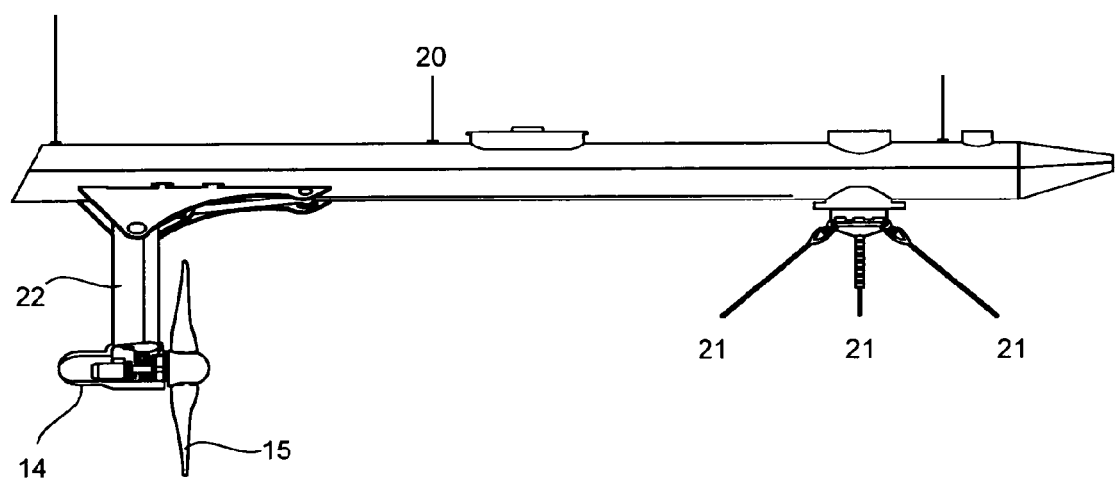
FIG. 8 is a perspective view of a tidal power plant incorporating a further embodiment of the present invention.

As shown in FIG. 8 the tidal power plant preferably comprises a beam 20 that is floating in a tidal stream and is anchored to the seabed by anchor lines 21. An arm 22 extending from the beam 20, carries a nacelle 14 to which a propeller 15 is attached.

Now, in the event of rotation of the wheel 16 and the low speed shaft 13 by tidal, the main shaft 10 rotates and this causes the large belt pulley 1 to rotate. Consequently, the further small belt pulleys 3, 3' rotate via the large belt/chain 5. This motion of the pulleys 3, 3' is then transferred to the secondary shafts 4, 4' and via these shafts to the small belt pulleys 2, 2'. The motion of the small belt pulleys 2, 2' is transferred to the high speed shaft (not shown) of the generator 7' via the small belts 6, 6' causing the generator 7' to rotate and generate electricity. There is also a terminal block 7''' arranged on the generator 7', which functions in the usual manner.

Figure 9:
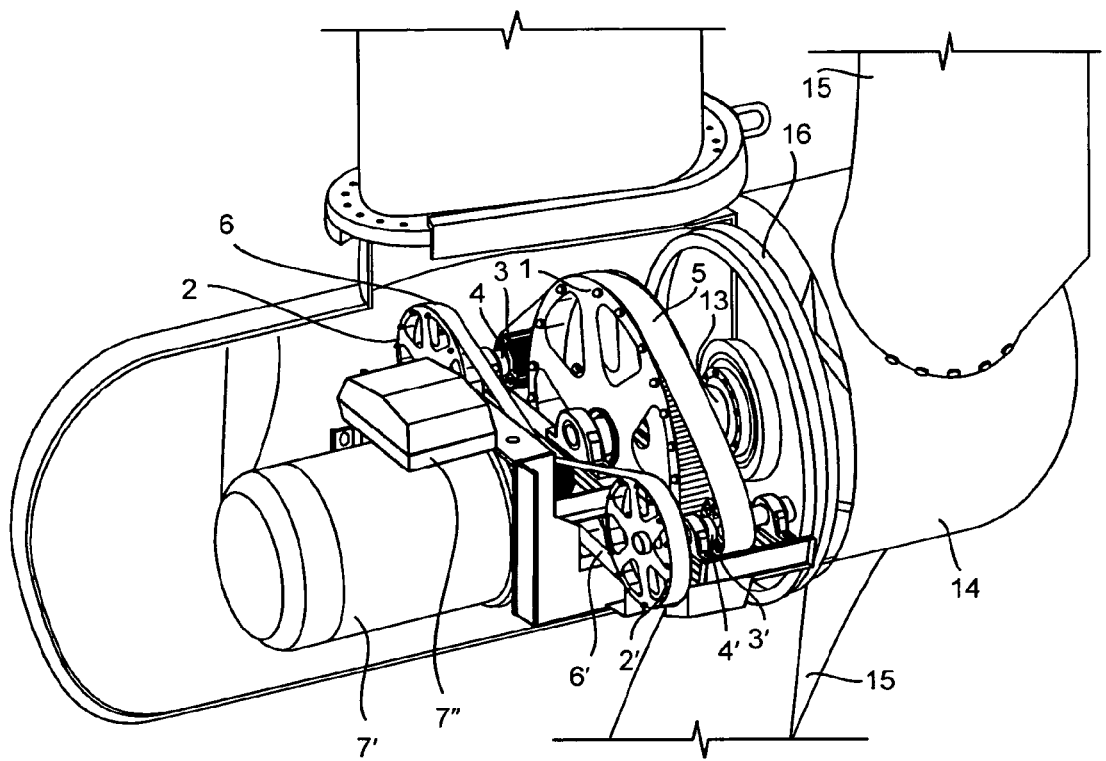
FIG. 9 is a detailed perspective view of a drive device for the tidal power plant according to FIG. 8.

The drive thus performs the role of gearing up the electric generator in the arrangement shown in the accompanying FIG. 9. As shown in such figure, the tidal current propeller 12 has at least two blades.

Preferably, the tidal current propeller 15, all pulleys 1, 2, 2', 3, 3' the main shaft 10, the secondary shafts 4, 4' and the shaft of the electric generator are all arranged to be co-axial. The device is adapted to cause rotation of the electric generator 7' in either direction. Further, the drive device is operatively connected to a brake mechanism located along the shaft of the tidal current propeller and is adapted to be actuated automatically, in the event of stoppage of the tidal current propeller. The brake mechanism may be applied manually also, when required.

Preferably, a plurality of said small belt pulleys 2, 2' and said further smaller pulleys 3, 3' smaller in diameter than respective said small belt pulleys are removably fitted to respective secondary shafts 4, 4', each said secondary shaft being in rotational connection to said large belt pulley 1 and to individual electric generators 7'.

Figure 10:
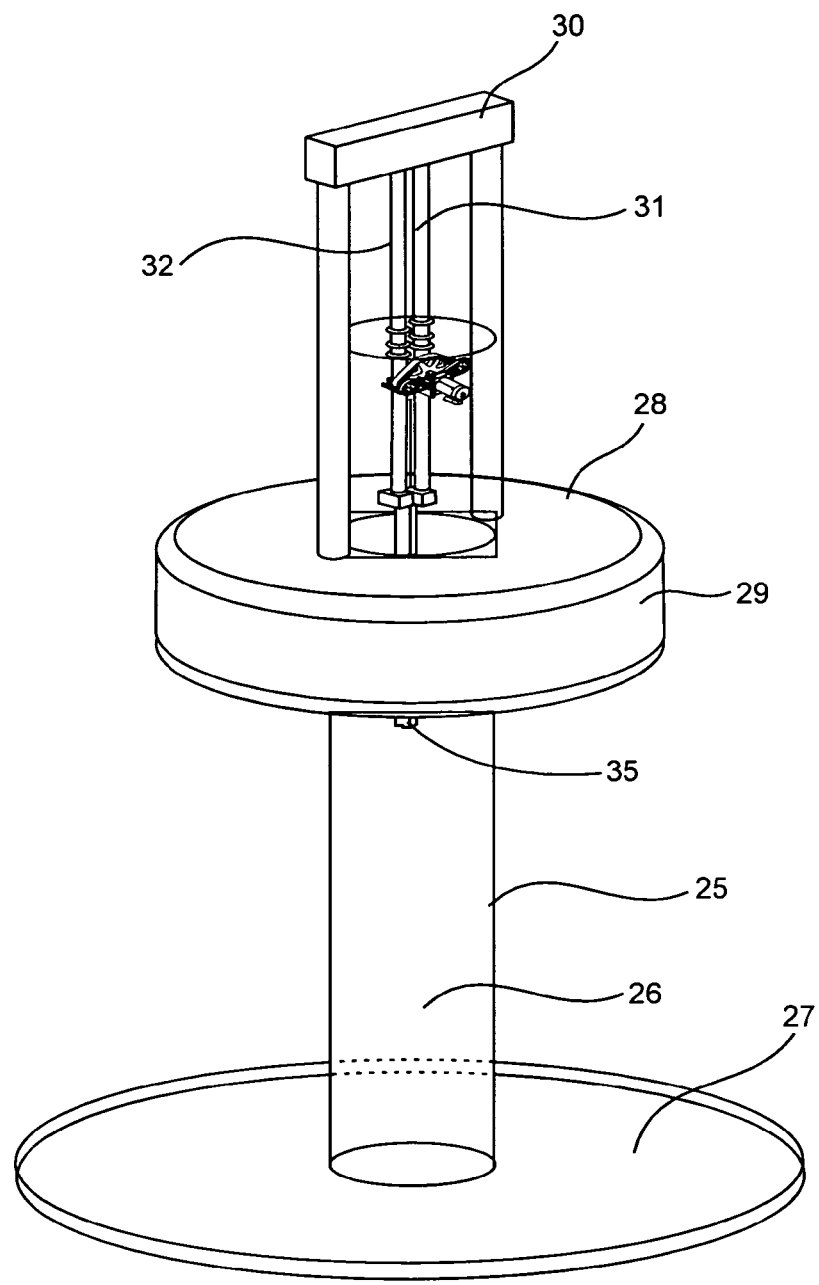
FIG. 10 is a perspective view of a wave power plant incorporating a further embodiment of the present invention.
Figure 11:
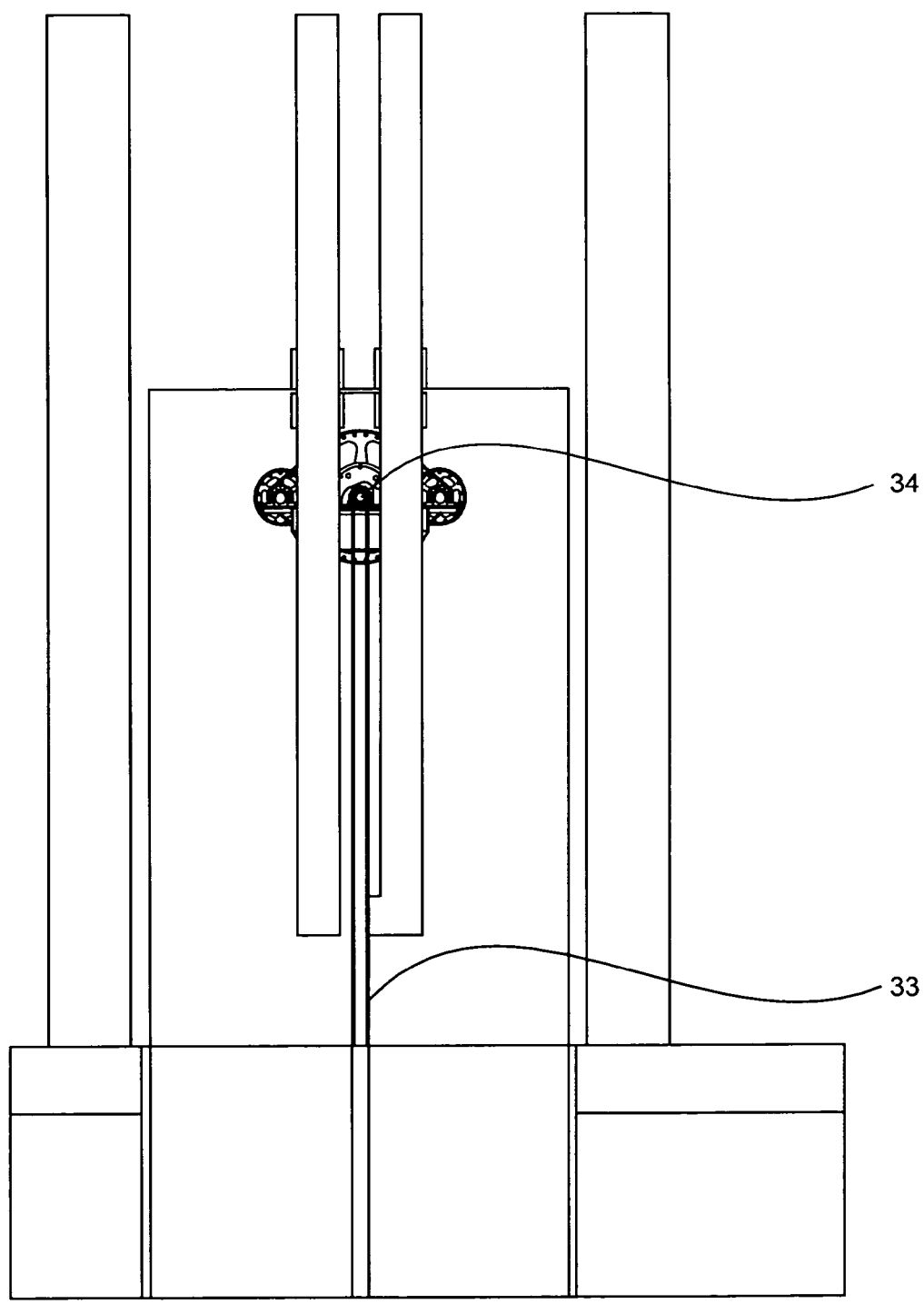
FIG. 11 is a detailed perspective view of a drive device for the wave power plant according FIG. 10.

FIGS. 10 and 11 show yet another embodiment of the present invention. In this embodiment the drive is used in a wave power plant. The wave power plant comprises two parts that are movable relative to one another. The first part 25 comprises a column 26 that has a horizontal plate 27 at its lower end. The plate 27 prevents the column 25 from moving with the waves. The second part 28 comprises a floating body 29 and a tower 30. From the tower 30 two rods 31 and 32 extend downward into the column 26. The floating body is adapted to move with the waves, and hence also relative to the column 26. A drive device according to the present invention is incorporated in the wave power plant to transfer the relative movement between the first 25 and second part 28 into rotational movement.

As shown in FIG. 11 shows a detail of the wave power plant. The drive device is fixedly attached to the upper part of the column 26. A long belt or chain 33 is attached to the lower end of one of the rods 31, 32. The long belt 33 extends around a pulley 34, which in turn is rotatably coupled to the large belt pulley 1 of the drive device. At the lower end, the long belt 33 extends around a lower pulley 35 (see FIG. 10), which is fixedly attached to the column 26. Consequently, the vertical movement of the rods 31, 32 will be transferred to the long belt 33 and then to the drive device of the present invention.

The drive device can be connected to a combined motor and generator.

As will be apparent to persons skilled in the art the other non-limiting advantages which this simplified arrangement achieves may be summarized as follows:

a) At least a doubling of utilization of the capacity of the belts is achieved. This is depending on the number of secondary shafts.

b) Reduction of shock loads.

c) Complex lubrication and cooling systems are not required.

d) The belts are light weight and made of soft material and so the pulleys over which they are placed are less prone to wearing.

e) Due to the simplified arrangement of belts/chains, light motors may be applied for conversion of high rotational speed to low rotational speed. This also ensures greater speed reduction and consequently generation of high torque.

f) Due to the simplified arrangement of belts/chains, light weight of the device is achieved for conversion of low rotational speed to high rotational speed.

g) Transmission of high power is achieved with a simplified light weight arrangement.

h) Ventilation based cooling and easy maintenance.

i) Higher efficiency compared to hydraulics j) Lower weight k) Less cost l) Greater possibility to run the drive in both directions with less wear.

The present invention has been described with reference to some preferred embodiments and some drawings for the sake of understanding only and it should be clear to persons skilled in the art that the present invention includes all legitimate modifications within the ambit of what has been described hereinbefore and claimed in the appended claims.

The invention claimed is:

1. A wave power plant comprising a drive device, said drive device comprising:
    a large belt pulley;
    a winch drum which is connected to said large belt pulley, the large belt pulley and the winch drum having coaxial rotational axes, said large belt pulley being rotatably connected to a single generator, and further having at least two rotatable secondary shafts, each being parallel to the rotational axis of said large belt pulley and being in rotational connection with said large belt pulley (1) via at least one belt; and
    said generator being in rotational connection with at least one of said secondary shafts via at least one second belt;
    wherein the at least one belt extends as a single belt over the large belt pulley and each secondary shafts; and
    the wave power plant comprising a longitudinal tension member coupled to the winch drum for transferring longitudinal movement between two relatively moveable parts of the wave power plant to the drive device.

2. The wave power plant according to claim 1, wherein there is provided a single belt or chain extending over each said secondary shaft and said large belt pulley.

3. The wave power plant according to claim 1, wherein a small belt pulley or chain pulley is removably fitted to each said secondary shaft.

4. The wave power plant according to claim 3, wherein there is provided along said secondary shafts at least two further smaller pulleys smaller in size than said respective small belt pulleys.

5. The wave power plant according to claim 4, wherein the at least one belt extends over said further smaller pulleys and said large belt pulley.

6. The wave power plant according to claim 1, wherein said secondary shafts are arranged around said large belt pulley at the same angular relative distance.

7. The wave power plant according to claim 3, wherein said large belt pulley and the small belt pulleys are provided with serrations or grooves, such as V-groove, along respective circumferential surfaces for ensuring proper gripping during running condition.

8. The wave power plant according to claim 1, wherein each belt/chain is provided with teeth/grooves/V-shape for ensuring proper gripping during running condition.

9. The wave power plant according to claim 1, wherein the winch drum, all said pulleys, the secondary shafts and the shaft of said generator are all arranged to be co-axial.

10. The wave power plant according to claim 1, wherein said drive device is adapted to cause rotation of the generator in either direction.

11. The wave power plant according to claim 4, wherein a plurality of said small belt pulleys and said further smaller pulleys smaller in diameter than respective said small belt pulleys are removably fitted to respective secondary shafts, each said secondary shaft being in rotational connection to said large belt pulley and to the generator.

12. The wave power plant according to claim 1, wherein a shaft of said generator is a high speed shaft.

13. The wave power plant of claim 1, wherein said large belt pulley comprises side plates and a set of circumferentially arranged toothed segments that are sandwiched between said side plates.

14. The wave power plant of claim 1, wherein said large belt pulley, said secondary shafts and said generator are mounted on a common frame.

15. The wave power plant of claim 1, wherein said at least one belt is made of fiber reinforced rubber.

16. The wave power plant of claim 1, wherein each of said secondary shafts are mounted on bearings arranged on either axial side of said large belt pulley.

* * * * *